(No Model.) 2 Sheets—Sheet 1.

A. & W. W. HEGE.
SHOCKING MACHINE.

No. 536,805. Patented Apr. 2, 1895.

Witnesses:—
L. I. Van Horn.
Charles B. Mann Jr.

Inventors:—
Abram Hege
W. W. Hege
By Chas. B. Mann
Attorney.

(No Model.) 2 Sheets—Sheet 2.

A. & W. W. HEGE.
SHOCKING MACHINE.

No. 536,805. Patented Apr. 2, 1895.

Witnesses:—
L. I. Van Horn.
Charles B. Mann Jr.

Inventors:—
Abram Hege
W. W. Hege
By Chas. B. Mann
Attorney.

UNITED STATES PATENT OFFICE.

ABRAM HEGE, OF HICKSVILLE, MARYLAND, AND WILLIAM W. HEGE, OF MARION, PENNSYLVANIA.

SHOCKING-MACHINE.

SPECIFICATION forming part of Letters Patent No. 536,805, dated April 2, 1895.

Application filed October 10, 1894. Serial No. 525,474. (No model.)

*To all whom it may concern:*

Be it known that we, ABRAM HEGE, of Hicksville, Washington county, in the State of Maryland, and WILLIAM W. HEGE, of Marion, Franklin county, Pennsylvania, citizens of the United States, have invented certain new and useful Improvements in Shocking-Machines, of which the following is a specification.

This invention relates to a machine or apparatus for use when harvesting corn, and has for its object to provide means to facilitate the formation of "shocks" and then depositing or standing the shock in the field wherever desired.

The invention is illustrated in the accompanying drawings, in which—

Figure 1:
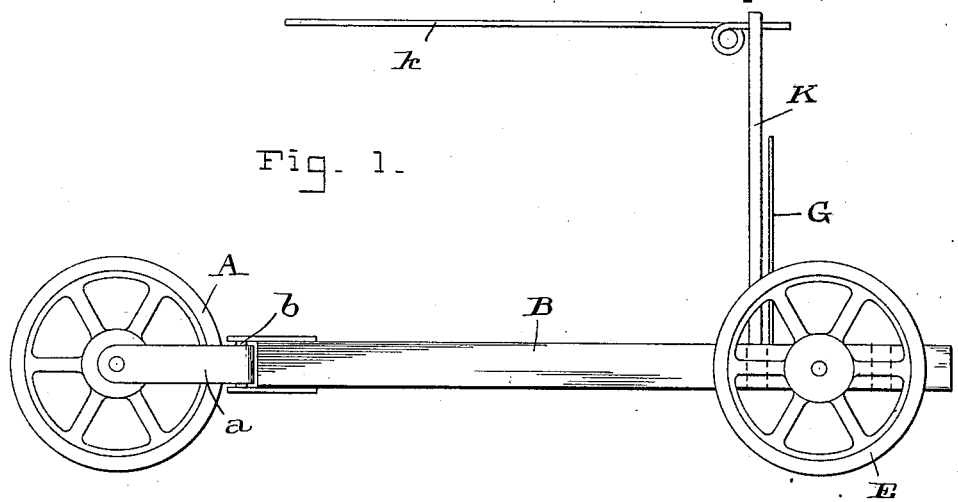
Figure 2:
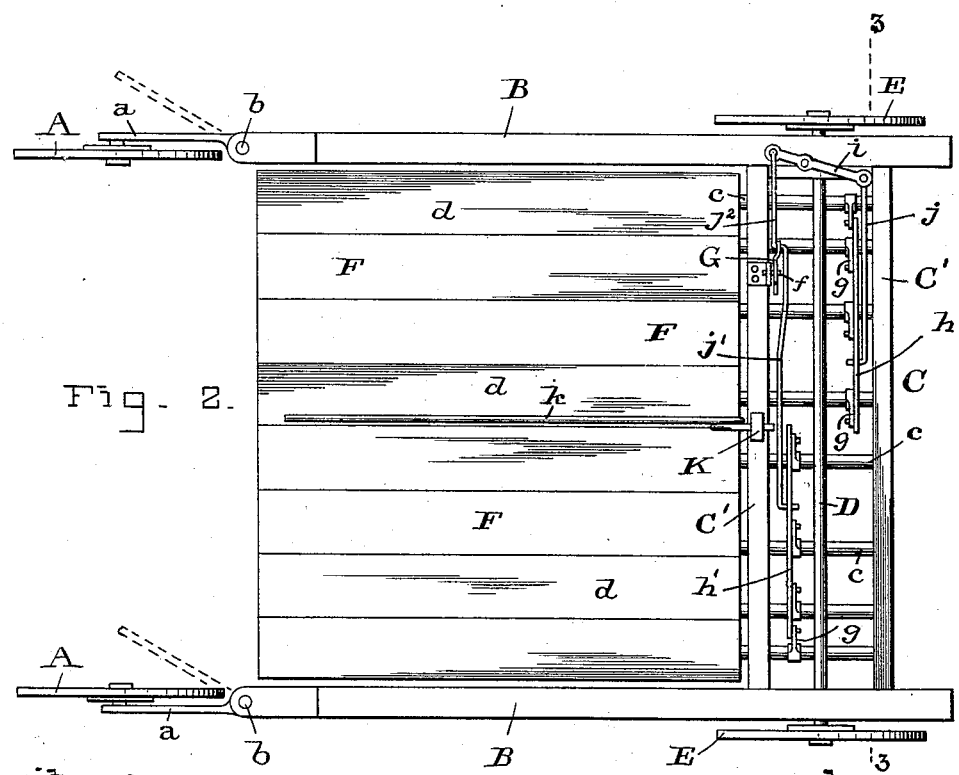
Figure 3:
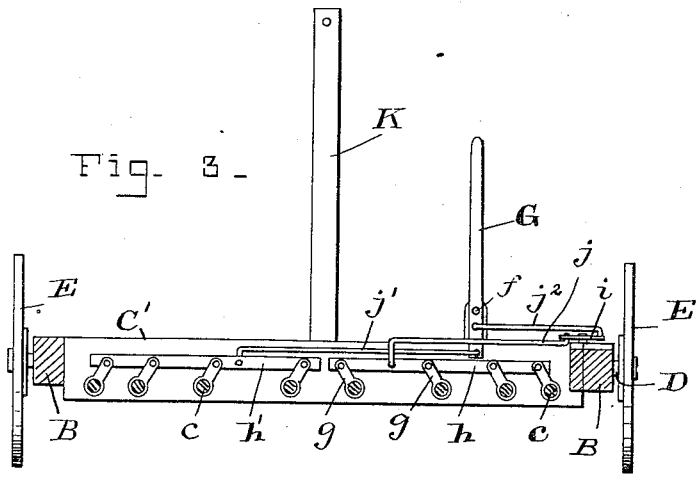
Figure 4:
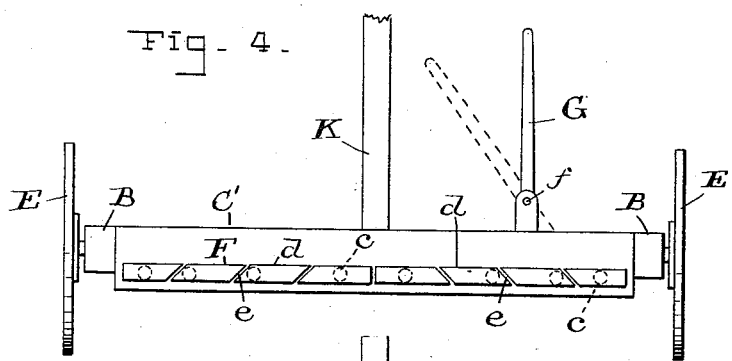
Figure 5:
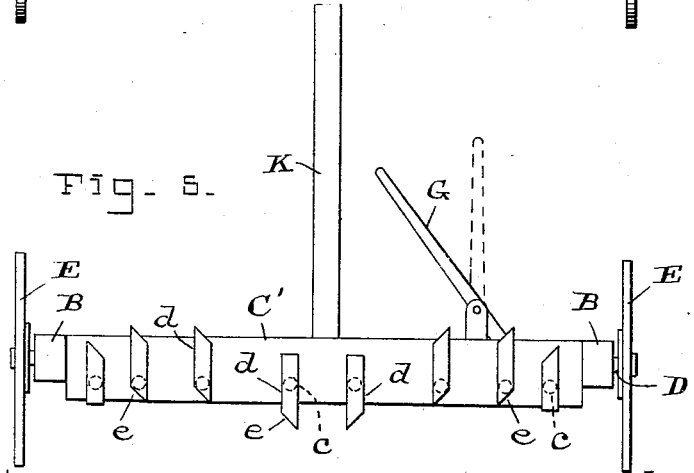

Figure 1 is a side elevation of the shocking machine. Fig. 2 is a top or plan view of same. Fig. 3 is a vertical cross-section on the line 3—3 of Fig. 2. In this view the front wheels, E, are not sectioned and the rear caster wheels, A, are removed. Fig. 4 is a rear end view of the machine showing the sections of the platform in the closed position ready for standing thereon corn stalks to form a shock, the rear wheels being removed. Fig. 5 is also a rear end view of the machine showing the sections of the platform tilted to the open position as when depositing a made-up shock on the ground, the rear wheels being removed.

The machine has a frame, C, a rod, D, serving as an axle, and is mounted on two wheels, E. In the present instance each side has a bar, B, extending from the frame, C, rearwardly, and the rear end of each side bar has a caster-wheel, A. Each caster-wheel is mounted at the end of a horizontal arm, $a$, which is pivoted by a bolt or pin, $b$, to the end of the side bar, B. The horizontal arm thus pivoted has a lateral swing, and thereby the two rear wheels will readily take an oblique position at one side or the other with respect to the side bars whenever the machine, in moving forward, is turned from a straight course. These wheels thus serve as caster wheels.

The frame comprises the two side bars, B, and the two cross-bars, C'. A platform is made up of longitudinal parallel sections, F, which tilt like a rock-shaft. These sections extend from the frame, C, rearward and occupy the space between the two side bars, B. Each section, F, has at one end an arm or spindle, $c$, which fits in suitable holes or bearings in the two cross-bars, C', in such manner as to rock therein like a rock-shaft. The sections are like boards and have a broad flat surface, $d$, with beveled edges, $e$. By reference to Fig. 4 it will be seen how these beveled edges abut or fit close together, and in this closed position form a broad level platform. By reference to Fig. 5, it will be seen how, when the sections are tilted, the platform is completely changed. Here the broad flat surface of each section is vertical instead of horizontal and an open space is formed between every two adjoining sections.

A lever, G, is pivoted at, $f$, and suitable connections are made between this lever and the several spindles, $c$, whereby the sections, F, may all be tilted one way or the other, as desired. The connections are so arranged that one-half of the number of sections—all those at one side of the center—will tilt to one side, or in one direction, while the other half of the sections will tilt to the opposite side, or the other direction. The connections referred to are shown in Figs. 2 and 3. Each spindle, $c$, has an arm, $g$, and the spindles at one side of the center, constituting one-half of the whole number, (in the present instance there are eight in all,) have their arms, $g$, inclined toward one side and united by a bar, $h$, the arms, $g$, being pivoted to said bar, while the spindles at the other side of the center have their arms, $g$, inclined toward the opposite side and united in like manner by a bar, $h'$. When either one of these uniting bars are moved endwise all the sections, F, whose spindle-arms, $g$, are pivoted to it, will be tilted.

The two uniting bars, $h$, $h'$, are so connected with the actuating lever, G, that when said bar is thrown in a certain direction, one uniting bar will be moved endwise one way while the other bar will have movement endwise the opposite way. This action is necessary in order to cause the sections, F, of the platform on the two sides of the center to tilt in opposite directions, as hereinbefore described. These connections are illustrated in Figs. 2 and 3. A lever, $i$, is pivoted to one side bar, B, between the two cross-bars, C'. One end of a rod, $j$, is pivoted to one of the uniting bars, $h$, and the other end to one of the free ends of the lever, $i$, and the other free end of this lever is connected by a short rod, $j^2$, with the actuating lever, G. The other uniting bar, $h'$, is connected to the said actuating lever by a rod, $j'$. Now by referring to Fig. 3, it will be seen that when the actuating lever, G, is thrown into the position indicated by dotted lines, the bar, $h$, and its spindles, $g$, will be forced in a direction to cause the free edges of those slats, $d$, which are at the left-hand side of the center to tilt upward and over toward the bar, B, at that side of the machine, while the other bar, $h'$, and its spindles, $g$, will be forced to cause the free edges of its slats, $d$, to tilt upward and over toward the board, B, at the other or right-hand side of the machine. Thus one-half of the sections, F, composing the platform will be tilted in one direction while the other half of the sections will be tilted in the opposite direction. This is important because the effect on the corn stalks composing a "shock" is to spread the lower ends of the stalks and thereby make a wider base for said shock when it is deposited on the ground.

We prefer to attach most of the spindles, $c$, to the sections, F, in the manner shown in the drawings. Here it will be seen that the side spindles are attached in line, or nearly in line, with one edge of a section, F, so that the opposite edge which tilts up will project up farther or have a greater upward-tilting surface than when attached centrally, the object being to have the up-projecting edges of the sections spread the lower ends, or stalk ends, of a "shock" of corn which is on the platform. Thus the lower or base end of the shock is made wider. This insures that the shock will stand and not fall down.

A standard, K, rises from the center of one of the cross bars, C', of the frame and a horizontal supporting rod or bar, $k$, extends from the standard above the platform toward the rear of the machine. The function of this bar, $k$, is to temporarily support the upper end of a shock being tied.

The operation is as follows: The corn-stalks as cut down in the field are placed in a proper quantity on the shocking apparatus with the base or lower ends of the stalks resting on the tilting section of the platform and supported by leaning against the bar, $k$. The stalks are then bound together in the usual manner to form the "shock" which is to be flared at the bottom and then deposited at a desired place in the field.

When the actuating lever, G, is operated to flare the lower end of the shock, one half of the sections, F, will tilt up in one direction while the other sections will tilt in the opposite direction. The lower ends of the stalks of the shock will first be flared or spread apart by this action, and then the weight of the shock will cause the stalk ends to settle down in the open space between the sections, see Fig. 5, so that said stalk-ends will rest upon the ground. The machine is then moved forward away from the shock, the sections, F, drawing away from the corn stalks leaving the shock standing on the ground.

Having thus described our invention, what we claim as new, and desire to secure by Letters Patent, is—

1. In a device of the class described, the combination of a suitable frame having at each side a bar, B, extending rearwardly; a platform composed of separate parallel slatted sections extending from said frame rearwardly—each slat provided at one end with a spindle substantially in line with one of its edges leaving the other edge free to tilt up, said spindles working in bearings in the frame so as to tilt therein like a rock-shaft, those slat-sections which are at the right-hand side of the center of said platform having their free edges to tilt up and over toward the side bar at the right-hand side and those slat-sections which are at the left-hand side of the center of said platform having their free edges to tilt-up and over toward the side-bar at the said left-hand side; a lever; a series of connections between the lever and one-half of the said sections, being those at one side of the center, and another series of connections between the said lever and the other half of the sections—being those at the opposite side of the center, whereby when the free edges of the slat-sections at the two sides of the center are tilted upward in opposite directions, the lower ends of the corn-stalks of the shock will be spread apart or flared and thus form a wider base for the shock to rest on the ground.

2. The combination of a suitable frame; having at each side a bar, B, extending rearwardly; a platform composed of separate slatted sections extending from said frame rearwardly—each slat provided at one end with a spindle substantially in line with one of its edges leaving the other edge free to tilt up, said spindles working in bearings in the frame so as to turn therein like a rock-shaft and provided with a spindle-arm; a bar, $h$, uniting all the spindle-arms of those slats which are at one side of the center and a bar, $h'$, uniting all the spindle-arms of the slats which are at the opposite side of the center; a pivoted lever, $i$, connected by one end to the said first uniting bar, $h$, and having a link, $j^2$, at its other end; a rod, $j'$, connected by one end to the other uniting bar, $h'$; and an actuating lever, G, to which is connected said link, $j^2$, and said rod, $j'$, substantially as and for the purpose described.

In testimony whereof we affix our signatures in the presence of two witnesses.

ABRAM HEGE.
WILLIAM W. HEGE.

Witnesses:
D. HARMONY,
E. M. SHADE.